United States Patent [19]

Griffin et al.

[11] Patent Number: 4,539,650
[45] Date of Patent: Sep. 3, 1985

[54] MASS CALCULATING AND INDICATING MEANS FOR WEIGHING MOVING VEHICLES

[76] Inventors: Thomas D. Griffin, 11707 LaMon St., Alsip, Ill. 60659; Peter S. Kopala, 638 N. Marion, Oak Park, Ill. 60302

[21] Appl. No.: 209,610

[22] Filed: Nov. 24, 1980

[51] Int. Cl.³ .................. G01G 9/00; G01G 19/03
[52] U.S. Cl. .................................. 364/567; 73/488; 177/136
[58] Field of Search ............... 364/567, 558; 73/509, 73/510, 488, 511; 177/136

[56] References Cited

U.S. PATENT DOCUMENTS

| | | | |
|---|---|---|---|
| 3,324,287 | 6/1967 | Fetterman et al. | 73/509 X |
| 3,532,869 | 10/1970 | Talmo | 364/558 X |
| 3,564,488 | 2/1971 | Higashi et al. | 73/488 X |
| 3,800,893 | 4/1974 | Ramsay et al. | 364/567 X |
| 4,049,069 | 9/1977 | Tamamura et al. | 364/567 X |
| 4,053,742 | 10/1977 | Halase et al. | 364/567 X |
| 4,094,367 | 6/1978 | Jones et al. | 364/567 X |
| 4,303,984 | 12/1981 | Houvig | 364/558 X |

FOREIGN PATENT DOCUMENTS 2406815  5/1979  France ............................ 73/509

Primary Examiner—Felix D. Gruber

[57] ABSTRACT

A mass calculation and indicating device particularly for weighing moving vehicles (trucks) on the highway. It includes means for sensing both the impact of the mass of the truck, and the speed, each producing an electronic signal, and using the signals to indicate the total weight of the truck. The mass is sensed by an impact component having a bladder, operating on fluid displacement, and producing an electronic signal thereby. The speed is sensed by a radar component, utilizing the Doppler effect, and produces another electronic signal. The two signals determine a signal which indicates the weight of the truck axles. The axles are sensed individually, both as to impact and speed, and the signals produced by these two factors are used as to each axle to show the weight of each axle, and are themselves combined to show the final total weight of the truck. A component is included to sense the presence of the truck in the sensing range, and its departure therefrom, to detect individual trucks following one another and thereby control the signals relating to each individual truck.

14 Claims, 7 Drawing Figures

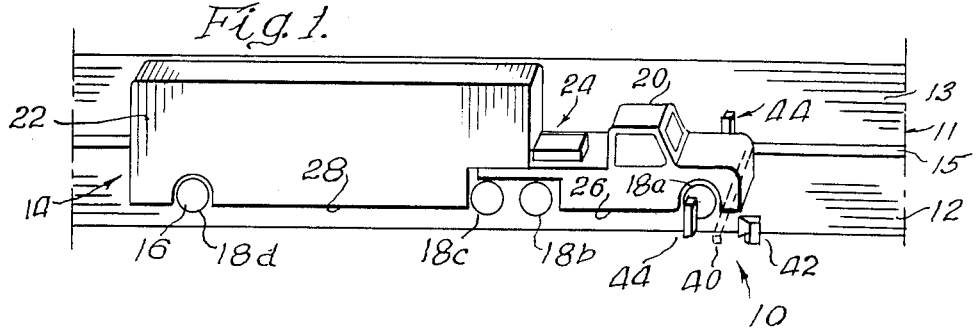
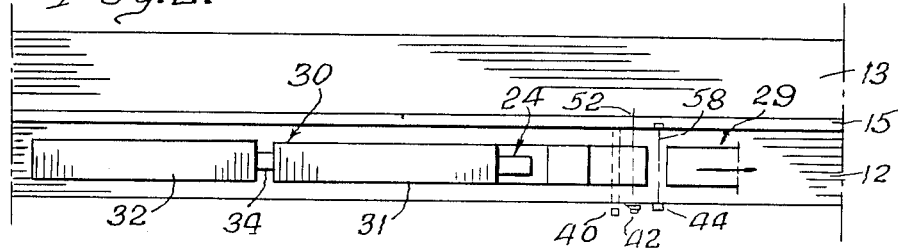
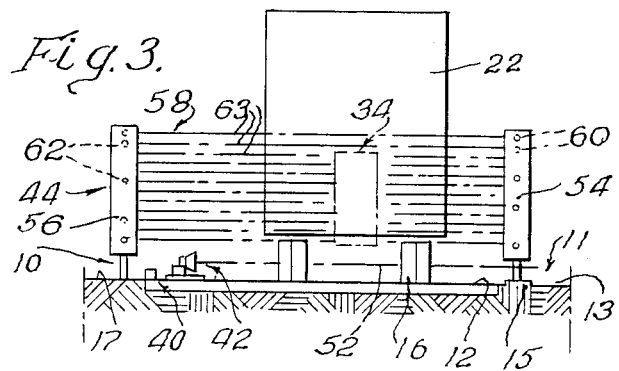
| AXLE WT | --SPEED-------- | | |
|---|---|---|---|
| | 60 | 45 | 20 |
| 40 000 | 3304.14 | 1892.33 | 373.79 |
| 30 000 | 2523.10 | 1419.24 | 280.34 |
| 24 000 | 2018.48 | 1135.40 | 224.28 |
| 12 000 | 1009.24 | 567.69 | 112.14 |
| 1 000 | 84.10 | 47.31 | 9.34 |
| 200 | 16.82 | 9.46 | 1.86 |
Fig. 6.

MASS CALCULATING AND INDICATING MEANS FOR WEIGHING MOVING VEHICLES

FIELD OF THE INVENTION

The invention resides in the general field of weighing objects, or vehicles, such as trucks, while they are in motion. Heretofore in the use of this broad field, difficulties arose, such as that a driver could vary the speed of the truck while it was in the range of the detecting device and thereby render the indicated weight inaccurate. The present invention overcomes that difficulty.

OBJECTS OF THE INVENTION

A broad object of the invention is to provide apparatus and method for weighing an object or vehicle in motion, and so weighing it accurately despite any variation in the speed thereof while it is in the sensing range of the apparatus.

Another and more specific object is to provide apparatus and method of the character referred to, which produces two kinds of electronic signals:

(a) a pressure signal produced by impact of the vehicle on a fluid displacement component,
(b) a speed signal produced by a radar component acting on a Doppler effect, and using the two electronic signals to indicate the weight of the vehicle.

A still more specific object is to indicate the weight of the individual axles of a vehicle in the foregoing manner, and then combining those weights to obtain the total weight of the vehicle.

Another object is to provide apparatus and method of the foregoing character, operable for sensing the final total weight of a vehicle as stated, and including an additional component for individually detecting vehicles following one another, that is effective for energizing and controlling the other components for performing the intended functions relative to each vehicle.

DESCRIPTION OF A PREFERRED EMBODIMENT

In the drawings:

FIG. 1 is a perspective view, showing the apparatus of the invention in association with a highway, and a vehicle on the highway;

FIG. 2 is a plan view of the highway and showing the apparatus of the invention diagrammatically, and a plurality of vehicles on the highway;

FIG. 3 is a sectional view taken at line 3—3 of FIG. 2;

FIG. 6 is an examplary table showing calculated weights for the corresponding inputs of speed and impact pressure;

Figure 4:
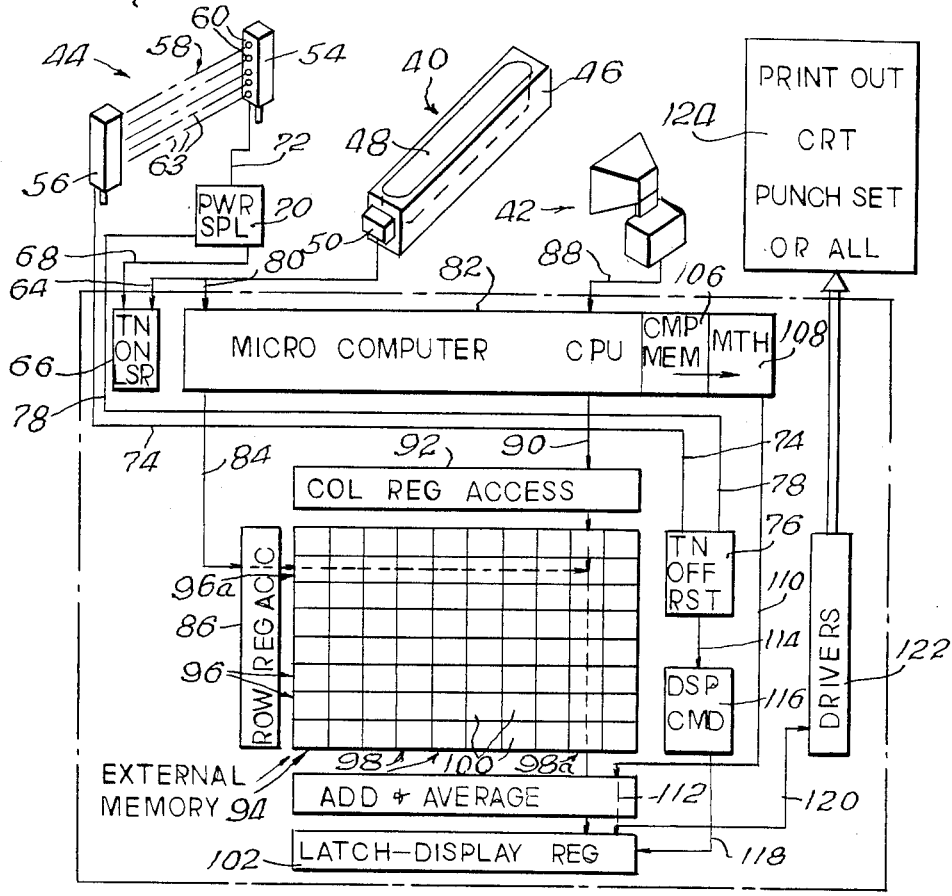
FIG. 4 is a diagram of the components of the apparatus and the electronic units associated therewith, for determining and indicating the weight of the vehicle.

Referring first to FIGS. 1–3, the apparatus is shown installed in relation to a highway. The apparatus is indicated in its entirety at 10, the highway indicated at 11, and the object or vehicle to be sensed and weighed at 14. The vehicle wheels are indicated at 16, and in the field of weighing vehicles, axles are referred to in accordance with the simultaneous action of all the wheels on a single axle. The axles are designated generally 18, being identified individually as the first axle, 18a, second axle 18b, etc., from front to rear. The highway includes lanes 12 and 13, a center strip 15, and a curb 17 at one side. The vehicle illustrated in FIG. 1 includes a tractor 20 and a semi-trailer 22, connected by a fifth wheel 24. The tractor has an undersurface 26 and the trailer an undersurface 28, both spaced significantly above ground, the space opening through the sides laterally therefrom, this opening in association with the axles or wheels being utilized in the sensing function of the radar component as described fully hereinbelow.

FIG. 2 shows two vehicles, 29 and 30, the second having a leading component 31 which may be similar to the vehicle 14 in FIG. 1, and a second component 32 constituting a full trailer connected with the semi-trailer 22 by means of a hitch 34. This hitch is shown also in FIG. 3 and it has significant dimensions vertically, in the functioning also of the radar component of the apparatus as described fully hereinbelow.

In FIG. 2 the second vehicle 30 closely follows the first vehicle 29 with a space 38 therebetween. This space also is significant in the functioning of the apparatus of the invention, and as fully described hereinbelow, it functions in contrast to the hitch 34 which constitutes a solid or block, in the overall functioning of the apparatus.

Weighing of vehicles is most particularly utilized in the case of trucks, in contrast to other vehicles, and for convenience herein, the vehicles to be weighed may also be referred to as trucks.

As referred to above, the weight of the truck is determined from two different kinds of signals, namely, one produced by mass impact, and the other by speed. Devices have been in use heretofore for weighing trucks while the trucks are in motion, but they were not fully effective because the speed of the truck is a necessary factor in accurately determining the weight; and the operators of the trucks in order to indicate a lower weight, would vary the speed of the truck while the truck was in the sensing range of the apparatus, resulting in inaccurate weight indications. The apparatus and method of the present invention, by utilizing the factors of both mass impact and speed, overcome that drawback of devices heretofore used, and produce accurate indications of weight.

The apparatus 10 of the invention includes three main units or components, an impact sensor 40, a radar unit 42, and a laser reset unit 44.

The impact sensor 40, as shown in FIG. 4 includes a structural box-like enclosure or container 46 with a bladder 48 therein, and a transducer unit 50 operably connected with the bladder to produce electrical signals upon actuation of the bladder. This impact sensor itself is of known kind. It is embedded in the material of the highway, or placed on the top surface thereof, but in any kind of such installation, the bladder 48 is positioned for engagement by the wheels of the truck, and under the impact thereof it is deflected, and it actuates or energizes the transducer 50 which produces an electric signal which is used herein for producing and controlling an electronic signal. This signal will be referred to again hereinbelow. The impact pressure sensor 40 is placed in the highway in position extending transversely thereof, so that both wheels, or all wheels, on each axel will engage it, and flex it, effectively simultaneously. The signal produced is therefore in proportion to the weight of that axel. Additionally, this impact sensor is so positioned longitudinally of the highway, in direct relation to the other components, 42, 44, for cooperative functioning therewith.

The radar unit 42 is also of known kind, and a unit identified as MPH Company Model K 15 may be utilized. It is positioned for transmitting a beam 52 across the highway, FIG. 3. It is positioned low so as to extend under the undersurfaces 26, 28 of the truck, whereby it will impinge on the wheels as they are passing by, but between the axels, the beam will pass under the truck, and thus produce separate signals, individually of the axels. This radar unit utilizes a Doppler effect and thereby senses the speed of the vehicle. A separate such signal is produced for each axel, as noted above, and the signal thus produced, is utilized for producing and controlling an electronic signal which is transmitted to the electronic arrangement represented in FIG. 4 as referred again hereinbelow.

The radar unit 42 and the impact sensor 40 may be relatively positioned longitudinally of the highway, so as to produce effectively simultaneous signals, when applied using the following formula determine the axle weight as referred to in FIG. 6:

$$W = [P \text{ (Bladder Pressure Internal)}]/(7.542 \times 10^{-7} V^2)$$

where
P = Pounds Per Square Inch (PSI)
W = Weight In Pounds
V = Velocity of Weight in Inches/Second Quantity $7.542 \times 10^{-7}$ = a constant which depends on the form of the pressure sensor, it's shape, volume, etc. Formula is derived from $E = \frac{1}{2} MV^2$.

The laser reset unit or component 44 is also of known kind. It includes a sender unit 54 and a receiver unit 56, the sender unit producing a main beam 58 directed to the receiver unit, thereby producing a corresponding signal and control function. In the present case, the sender unit 54 includes a relatively large plurality of light elements 60, such as sixteen, eighteen, twenty, etc., arranged vertically throughout a predetermined vertical dimension. For each light element 60, there is a corresponding receptor element 62 in the receiver unit, these light elements and receptor elements being individually aligned, with a single individual beam or ray 63 between the two. These light elements and receptor elements are arranged in series so that when all of them are energized by the respective beams, a series electrical connection is established, and all the other functions are concluded, and a reset signal is produced; but if any one of the aligned light units/receptor units is blocked, then so signal is produced.

The vertical distribution of the elements 60, 62, is such that at least one is blocked by some element of the truck, continuously throughout the length of the truck. While the main portions, such as the tractor and trailers, are within the range of the main beam, all of the individual beams may be blocked. However, when portions of lesser vertical dimensions are encountered, such as the fifth wheel connection 24, or the hitch 34, at least portions of them are within the vertical range of the beams and then at least one of the individual beams is blocked, and usually more than one. The objective of this arrangement is that so long as any portion or element of the truck, whatever its vertical dimension or location, is in the beam 58 of this laser unit, no signal is produced by the laser unit. However, when trailing end of the truck leaves the beam 58 (FIG. 2), the beam is fully reestablished, with all of the individual units 60, 62 being energized, and a resulting reset signal is produced, as referred to again hereinbelow. The representation of the plurality of trucks in FIG. 2, with one following closely after the other, indicates that regardless how close the vehicles are positioned, and how small the space 38 is, the beam 58 will be reestablished with coresponding functions produced, indicating the respective vehicle has passed the sensing range of the apparatus, and the apparatus when so reset, is operable for sensing the next vehicle.

The laser reset unit 44 is positioned, longitudinally of the highway, relative to the units 40, 42, so that the beam 58 thereof is interrupted by the truck at least an instant before the sensing functions are performed by the units 40, 42, so as to cancel any reset signal or eliminate it, and to enable the units 40, 42 to function throughout the passage of the truck through the sensing range. The units 40, 42, 44 are represented only diagrammatically, both as to size and shape, and their positioning relative to the highway and to each other.

Referring to FIG. 4, the impact sensor 40, upon impingement thereon of the wheels, produces a signal which is transmitted through a conductor 64 and operative for actuating a control unit 66. Leading from the unit 66 is a conductor 68 to a power supply unit 70 from which another conductor 72 leads to the laser reset unit 44. This signal is produced by the leading end of the truck intercepting the beam 58, and the unit 44 remains ON so long as at least one of the individual beams or rays 63 is interrupted by the truck. After the trailing end of the truck passes, and the gap 38, or an open space, occurs, all of the beams 63 are re-established and a signal is transmitted thereby through a conductor 74 to a turn off and reset control unit 76. Another conductor 78 returns from the unit 76 to the power supply 70.

The signal produced by the impingement of the wheels on the impact sensor unit 40 is also transmitted through the conductor 80 to the microcomputer 82, and through an extention 84 Of the conductor to a row register 86.

The radar unit 42 transmits a signal through a conductor 88 to the micro-computer 82, and through an extention 90 of that conductor to a column register 92.

The apparatus of FIG. 4 includes an external X - Y Read Only Memory 94 which includes a plurality of rows 96 and a plurality of columns 98 of units or cells 100 each representing an element of a signal, such for example as a "1" or "0" of a binary system. This unit in itself of known kind.

Upon actuation of the impact sensor 40, a voltage of a value corresponding to the mass of the load (one axle) is produced in the transducer 50. This signal is transmitted to the micro-computer 82 which in turn transmits a corresponding electronically computed signal to the corresponding row 96, individually identified 96a, of units 100. In an assumed example, that row is the third one down in the illustration.

In a similar manner, when the radar unit 42 senses a wheel on the truck, a signal is produced corresponding to the speed of the truck, under the Doppler effect, and it is transmitted to the micro-computer 82. The latter then electronically computes that signal and produces a corresponding electronic signal and transmits it to the external memory 94 in the corresponding colum 98, individually identified 98a, which in the assumed example is next to the last toward the right.

Figure 5:
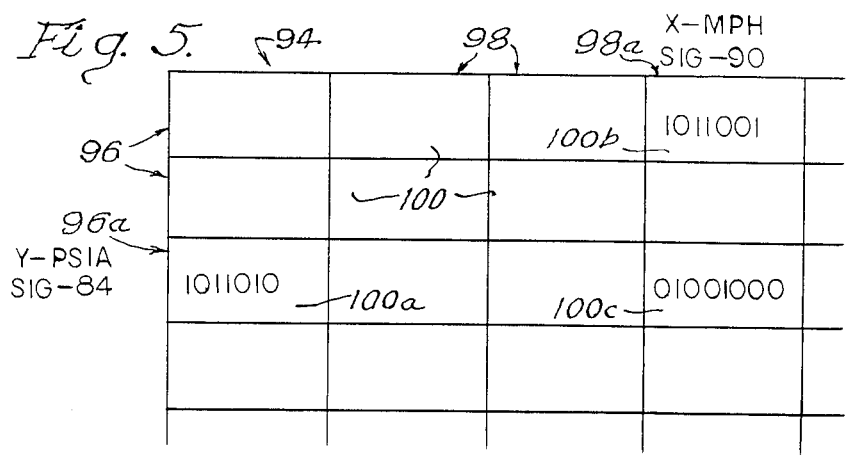
FIG. 5 is an example of how the X - Y Read Only Memory within the computer would determine a weight using the two input signals.
Figure 7:
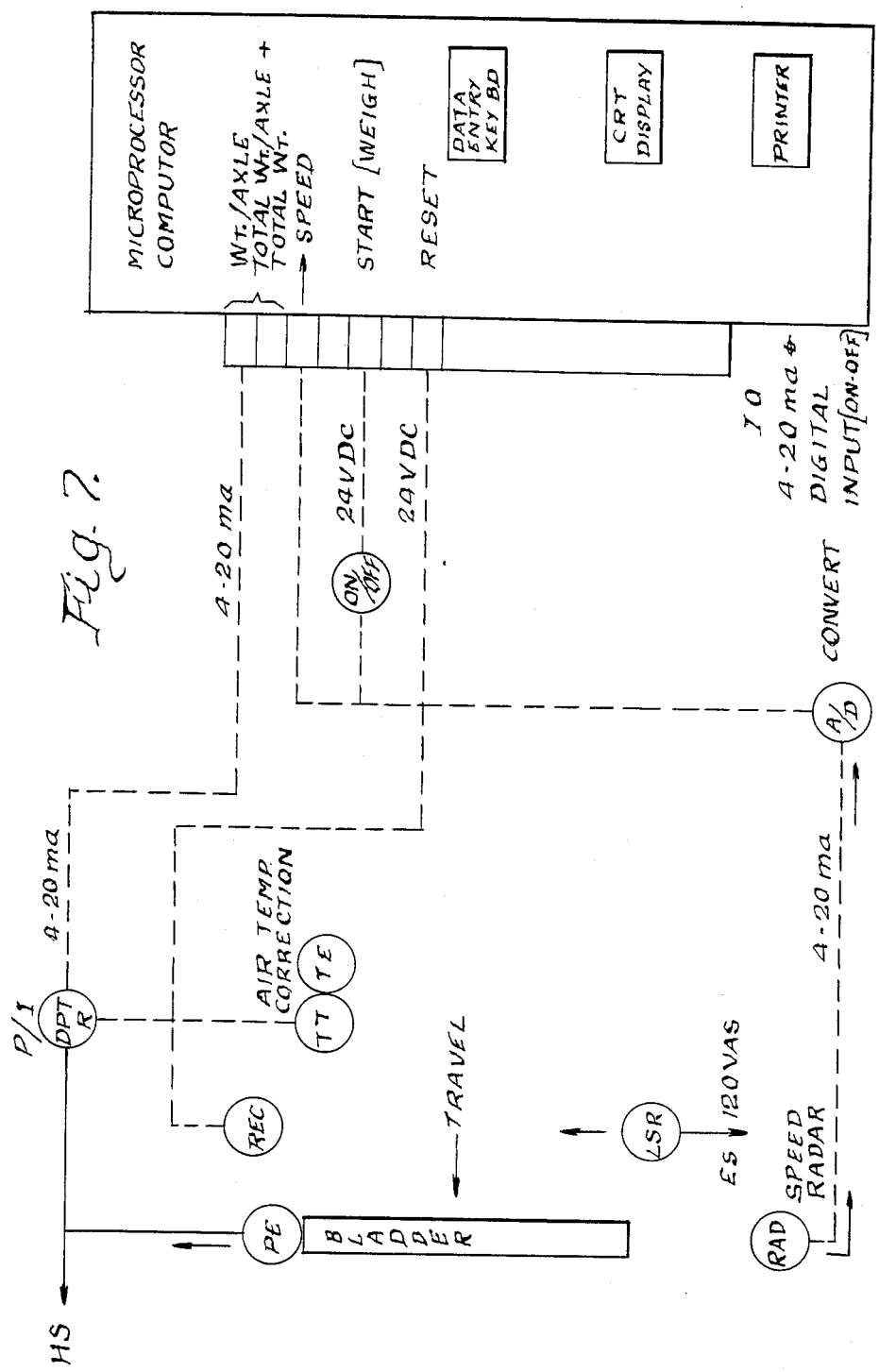
FIG. 7 is a schematic of FIG. 4

FIG. 5 shows the reconverted signal combined from the foregoing two signals representing the weight and speed. Following common practice, the binary system of signals is used. The two individual signals referred to signal X, or mph, in cell 100b, and signal Y, or psi a, in cell 100a, and where the row and column intersect, the combined signal Z, or lbs., occurs, at cell 100c. As mentioned above, this combined signal represents one axle, and those representing all the axles will be added as referred to below.

The signals transmitted to the micro-computer 82, from the units 40, 42 are also transmitted to a complementary memory unit 106 from which signals are then transmitted to a mathematical computation unit 108. The results of the computation of the unit 108 are then transmitted through the conductor 110 to the add & average unit 112. This unit 112 adds all the signals corresponding to the axles and transmits this signal on. The control unit 76 transmits a signal through the conductor 114 to a display command unit 116, and a signal from the latter unit is transmitted through the conductor 118 to the unit 102.

The signal from the unit 102 includes the added signal, including all those representing the individual axles of the truck, and is transmitted to a conductor 120 to drivers 122 and then to a final register or record device 124. This final unit 124 may be a print-out, CRT, punch set, or all of the foregoing. The principal feature of the invention is thus exemplified, - the use of the signals produced by the two factors involved, namely, the mass and the speed of the truck, and the application of these signals for producing a final weight signal, which is accurate, since any variation in speed of the truck within the sensing range of the apparatus is accommodated and incorporated in the determination corresponding to the individual axles.

The signal produced by the radar unit 42 is in accordance with the speed of the truck, and, what is particularly important, the speed of the individual wheel or axle. If the truck should change speed within the sensing range of the apparatus, the radar unit, by virtue of the Doppler effect, will produce a signal representing each individual wheel in accordance with the speed of that wheel, Hence, if the first wheel should be going at a certain speed, and the second wheel at a lesser speed, the unit 42 will produce a signal at the second wheel, corresponding to the lesser speed. As is known, a given mass engaging the inpact sensor, produces a signal in proportion to the speed, and hence a lesser speed would produce a signal of lesser value than a faster speed, for any given mass. The signals thus produced by the radar unit 42 are converted by the micro-computer 82 and transmitted to the respective one of the columns 98, and where the row and column intersect or cross, as stated, a corresponding combined signal is transmitted to the units 112, 102.

Reference is made to FIG. 6 constituting, in abbreviated and elliptical form, mathematical or numerical values corresponding to the impact of an axle according to the mass thereof at different speeds. These figures are the representations of the values automatically included in the calculations of the signals represented in the rows 96. For example, an axle of 40,000 lbs. weight traveling at 60 mph. will produce a pressure having a numerical value of 3364.13. The same weight traveling at 30 mph. will produce a pressure of a numerical value of 841.13.

In a similar manner, a weight of 30,000 lbs. traveling at 60 mph. will produce a pressure at a numerical value of 2523.10, while the same weight traveling at 50 mph. will produce a pressure of a numerical value of 1752.15. Corresponding signal values are accessible for any range desired, both as to weight and speed, and in any increment desired.

We claim:

1. A device for calculating the weight of a load, comprising,
    an impact sensor unit including a bladder adapted for travel of the load thereover, and a transducer operable for producing a signal by the flexure of the bladder caused by a load passing thereover, and in proportion to the extent of said flexure,
    a speed sensor operable for producing a signal, in response to sensing the speed of the load passing over the impact sensor unit, corresponding with the speed of the load so passing, and
    computer means operable for sensing said two signals and utilizing them and thereby producing a specific signal indicating the weight of the load.

2. A device according to claim 1 wherein the load includes a plurality of spaced elements engageable successively with the impact sensor unit, wherein,
    the impact sensor unit in response to being engaged by said elements being operable for producing an individual signal corresponding to each of the elements,
    the speed sensor is operable for sensing said speed elements and producing a corresponding number of discrete signals, the same in number and respectively simultaneously with the impact signals,
    the computer means is operable for determining the respectively simultaneously occuring signals and adding them and thereby producing corresponding final signals indicating the weight of the loading having all of said spaced elements.

3. A device according to claim 1 wherein,
    the impact sensor unit and the speed sensor unit are operable for producing effectively simultaneous signals, and
    the apparatus includes computer means operable for using such two signals producing a final signal.

4. A device according to claim 1 wherein,
    the impact sensor unit, and the speed sensor unit, are operable for producing electronic signals of predetermined numerical value, and
    the computer means is operable for producing a combined numerical value in proportion to the total numerical values of the individual signals.

5. Apparatus according to claim 4 wherein,
    the apparatus includes computer means for representing said electronic signals respectively in transverse positions relative to each other, and a third final signal corresponding with the position in which said electronic signals effectively intersect.

6. A device according to claim 5 wherein,
    the electronic signals are in the form of binary signals.

7. A device according to claim 1 wherein,
    the apparatus includes a sensing unit operable for sensing a vehicle in the range of sensing of the apparatus,
    said sensing unit being operable for producing a signal for controlling the apparatus which uses the two second signals to produce a final signal, and to reset the apparatus and render it effective for sensing a vehicle again passing through the sensing range.

8. A device according to claim 1 wherein, the speed sensor unit includes radar sensing means and utilizes a Doppler effect.

9. A device according to claim 7 wherein, the sensing unit includes sending and receiving units respectively on opposite sides of the highway with laser beams arranged for interruption by the passage of a vehicle therethrough.

10. A device according to claim 9 wherein the sensing unit includes a plurality of vertically distributed elements in both the sender and receiver, the respective elements and the two components producing individual beams respectively, and wherein, the elements are arranged in series whereby upon interruption of any of the individual beams, no signals is produced, and upon none of them being interrupted and all being established, a signal is produced for re-setting the signal producing means.

11. A device according to claim 7 wherein, the sensing device is a laser.

12. In a system for determining the weight of a vehicle in motion, the system responding to the vehicle impact for measuring pressure, a radar unit for measuring vehicle speed and a microprocessor including a memory having data stored therein which relate pressure and speed to weight, a method comprising the steps: generating a first signal corresponding to pressure, as a first memory address; generating a second signal corresponding to speed, as a second memory address; and reading out from memory a value which corresponds to vehicle weight.

13. The method of claim 12 where the vehicle has a plurality of axles or spaced elements, and including the steps of sensing the spaced elements individually and generating respective first and second signals for each element; generating individual weight values and combining these values.

14. The method of claim 13 where a vehicle presence sensor is provided and including the steps of sensing vehicle presence, generating weight values for the individual axles and combining the values while the vehicle is present, whereby the total weight value is obtained.

* * * * *